United States Patent
Rumpf et al.

(10) Patent No.: US 7,305,685 B2
(45) Date of Patent: Dec. 4, 2007

(54) INSERTING AND EXTRACTING DEVICE FOR ROTATABLE DATA CARRIER PLATES

(75) Inventors: Horst Rumpf, Herborn (DE);
Christian Hopf, Wetzlar (DE);
Christian Reichinger, Neutraubing (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 353 days.

(21) Appl. No.: 10/537,576

(22) PCT Filed: Dec. 2, 2003

(86) PCT No.: PCT/IB03/05556

§ 371 (c)(1),
(2), (4) Date: Jun. 6, 2005

(87) PCT Pub. No.: WO2004/053865

PCT Pub. Date: Jun. 24, 2004

(65) Prior Publication Data

US 2006/0090174 A1    Apr. 27, 2006

(30) Foreign Application Priority Data

Dec. 10, 2002  (EP)  .................................. 02102710

(51) Int. Cl.
*G11B 17/04*   (2006.01)
*H01L 41/09*   (2006.01)
*H02N 2/04*    (2006.01)

(52) U.S. Cl. .............. 720/623; 310/323.17; 310/323.02

(58) Field of Classification Search ........... 310/323.02, 310/323.17, 323.01, 323.06, 328; 720/623, 720/620, 622
See application file for complete search history.

(56) References Cited

U.S. PATENT DOCUMENTS

| | | | | |
|---|---|---|---|---|
| 5,633,554 A | * | 5/1997 | Kaji | ........................... 310/328 |
| 5,732,058 A | * | 3/1998 | Iwamura et al. | ............ 720/629 |
| 5,856,966 A | * | 1/1999 | Nakamichi | ................. 720/622 |
| 5,878,011 A | * | 3/1999 | Nakamichi | ................. 720/606 |

(Continued)

FOREIGN PATENT DOCUMENTS

EP    0951078 A1    10/1999

(Continued)

OTHER PUBLICATIONS

M. Herrmann, et. al: Piezoelectric Travelling Wave Motors Generating Direct Linear Motion: Bremen Jun. 26-28, 1996, Conference Processings, S. 200-203.

*Primary Examiner*—William J Klimowicz
(74) *Attorney, Agent, or Firm*—Michael E. Belk

(57) ABSTRACT

The invention relates to an inserting and extracting device for rotatable data carrier plates which mechanically moves the data carrier plate (1) from an inserting position into a playing position before playing and back into the inserting position again after playing, with parallel guide rails (2) which extend over the full range of movement for insertion and extraction and which guide the data carrier plate (1) in grooves (5) at diagonally mutually opposed edge regions, wherein at least one of the guide rails (2) transmits to the data carrier plate (1) motion pulses in one of its directions of movement, by means of which pulses the data carrier plate (1) is moved in the insertion or extraction direction.

23 Claims, 5 Drawing Sheets

U.S. PATENT DOCUMENTS

| | | | |
|---|---|---|---|
| 5,952,766 A * | 9/1999 | Mukohjima et al. | 310/323.04 |
| 6,068,256 A * | 5/2000 | Slutskiy et al. | 271/264 |
| 6,242,850 B1 * | 6/2001 | Slutskiy et al. | 310/328 |
| 6,337,532 B1 * | 1/2002 | Johansson et al. | 310/323.02 |
| 7,146,619 B2 * | 12/2006 | Kikkoji | 720/619 |

FOREIGN PATENT DOCUMENTS

| | | |
|---|---|---|
| EP | 0951078 B1 | 10/1999 |
| JP | 63316676 A * | 12/1988 |
| JP | 2001211670 A * | 8/2001 |

* cited by examiner

INSERTING AND EXTRACTING DEVICE FOR ROTATABLE DATA CARRIER PLATES

TECHNICAL FIELD

The invention relates to an inserting and extracting device for rotatable data carrier plates which mechanically moves the data carrier plate from an inserting position into a playing position before playing and back into the inserting position again after playing.

Such inserting and extracting devices for rotatable data carrier plates are known. CD or DVD data carrier plates are usually inserted or ejected by means of a sliding drawer in stationary devices for playing CDs or DVDs. A sliding drawer mechanism is not possible in devices used in motor vehicles because of a lack of space. Insertion and extraction take place by means of a roller mechanism.

These known mechanisms consist of a large number of individual components, which renders them intricate and expensive. A further disadvantage is that they do not correctly guide the data carrier plate, because the roller operation grips only the edges, and indeed only in certain points.

SUMMARY

It is an object of the invention to provide an inserting and extracting device which provides a better guidance for the plate during the entire moving process and which is formed by fewer functional components.

The above object is achieved by the characteristic features of claim 1.

Since the guide rails extend along the entire range of movement of the data carrier plate and guide the latter at diagonally mutually opposed edge regions, the data carrier plate is continually guided during its insertion and extraction. This is advantageous for devices which are subject to shocks. If at least one of the guide rails transmits motion pulses, for example for impact-type motions, to the data carrier plate in one of its directions of movement, any further motion mechanisms are redundant. The guide rails themselves act as the transport generators. The expenditure on components necessary for operation and the space requirement are considerably reduced thereby.

It is provided in an embodiment of the invention that the motion pulses are exerted on one or both of the guide rails by means of a piezoelectric drive. Pulsatory pushing movements in a forward direction are characteristic of piezoelectric drives.

Piezoelectric drives, or motors, are known in a wide variety of embodiments. The proceedings of the conference ACTUATOR 96 describe a linear traveling wave motor with a closed annular stator (Hermann, M; Schinköthe, W: Piezoelectric Travelling Wave Motors generating direct linear motion . . . , Proc. of ACTUATOR, Bremen, 26-28 Jun. 1996, pp. 200-203). The first limb of the motor is arranged along the path of an object. The two limbs are interconnected semi-circularly at their end faces. Two phase-shifted voltages are necessary for a movement in one direction in the case of traveling wave motors. Although this motor can be given a very flat construction perpendicularly to the moved object, it still has two disadvantages: the bulk of the stator is greater than double the possible path; and secondly, two harmonic voltages are needed simultaneously.

Piezoelectric micro impact motors such as those described, for example, in EP 0951078 require a substantially smaller constructional volume than do traveling wave motors; also they are operated with only one harmonic voltage. These motors, however, have their greatest dimension of the order of 10 to 20 mm perpendicularly to the direction of movement. It is at least not simple with these motors to realize the movement of the contact point necessary for a direct drive.

In order to realize a piezoelectric drive of small volume, given the narrow space conditions in a player used in a motor vehicle or a home computer, it is provided in a further embodiment of the invention that the piezoelectric drive is formed by piezomotors, each of which exerts an impact force on one guide rail. One motor acts in the insertion direction, the other in the extraction direction.

A very compact construction is made possible by such an arrangement. The motor is flat in the movement direction and need be excited only by one standing wave in accordance with the micro impact principle. The number of required components is small.

It is provided in a further embodiment of the invention that each guide rail itself is a piezomotor comprising a stator provided with stator teeth and a piezoelectric element whose active cell serving for driving has a length of at least one half wavelength.

It is provided in another embodiment of the invention that each guide rail itself is a piezomotor comprising a stator provided with stator teeth and a piezoelectric element, wherein the length of the exciting part corresponds to two wavelengths.

It is provided in a further embodiment of the invention that only one guide rail itself is a piezomotor comprising a stator provided with stator teeth and a piezoelectric element whose active, exciting cell has a length of at least one half wavelength or an integer multiple of one half of a wavelength.

It is provided in a further embodiment of the invention that the piezoelectric element of the motor is formed by a piezoelectric ceramic element which has regions of alternating polarity with a length of $\lambda/2$, while covering electrodes are provided of which one electrode adjoining the stator extends over the full length of the ceramic element and electrodes having a length of $\lambda/4$ and situated at the other side of the ceramic element are alternately connected to terminals of alternating polarity.

It is provided in a further embodiment of the invention that only those regions of a piezomotor for one direction of movement which are covered by the associated control electrodes are made from piezoelectric material.

It is provided in a further embodiment of the invention that the stator for one impact direction is prolonged in longitudinal direction over and beyond the piezoelectric element by means of extensions to an amount of an odd multiple of $\lambda/4$.

It is provided in a modified embodiment of the invention different from the above that the stator for an opposed impact direction is prolonged in longitudinal direction over and beyond the piezoelectric element to an amount of an even multiple of $\lambda/4$.

It is provided in a further embodiment of the invention that the minimum length of the active cell and additional stator material corresponds at least to one wavelength $\lambda$.

It is provided in a further embodiment of the invention that the exciting portion of the stator is prolonged by odd multiples of $\lambda/4$ on one half of the guide rail and by even multiples of $\lambda/4$ on the other half.

It is provided in a further embodiment of the invention that the two halves of the guide rails are decoupled from one another by means of blade springs at the level of the neutral oscillation line.

It is provided in a further embodiment of the invention that the resonance frequency $F_i$ of the motor is expressed by $$F_i = \frac{((i+1/2) \cdot \pi)^2}{\sqrt{12}} \cdot h/l^2 \cdot \sqrt{E/p},$$

in which I by first approximation is dependent on the order of the standing wave I, on the length l of the stator, on the height h of the stator, on the material constant, on the elasticity module E, and on the density ρ of the stator material.

It is provided in a further embodiment of the invention that the stator teeth are arranged at distances of λ/2 in locations between the antinodes and nodes formed in the oscillation.

It is provided in a further embodiment of the invention that the motor has approximately the length of the path of movement of the data carrier plate.

It is provided in a further embodiment of the invention that the motion pulses are transmitted to the respective guide rail and through the latter to the data carrier plate by means of an eccentric mechanism.

It is provided in a further embodiment of the invention that the eccentric mechanism causes the guide rail propelled by said eccentric mechanism to oscillate about a center of rotation, and the oscillations of the guide rail impart to the data carrier plate a forward pulse in the motion direction.

It is provided in a further embodiment of the invention that the eccentric mechanism transmits oscillation pulses to a belt conveyor which transmits said pulses as driving pulses to the data carrier plate.

It is provided in a further embodiment of the invention that the belt conveyor moves the data carrier plate in the insertion or extraction direction in accordance with the direction of its circulatory movement. The belt conveyor has a grooved profile with which the edge of the data carrier plate comes into engagement.

It is provided in a further embodiment of the invention that the stator teeth are provided with grooves in longitudinal direction of the piezomotor, into which grooves the data carrier plate enters with its edge.

It is provided in a further embodiment of the invention that the piezoelectric motor in general is used for the linear drive of components to be moved by means of impact pulses.

BRIEF DESCRIPTION OF THE DRAWINGS

The invention will be explained in more detail with reference to the drawings, in which.

DETAILED DESCRIPTION

Figure 1:
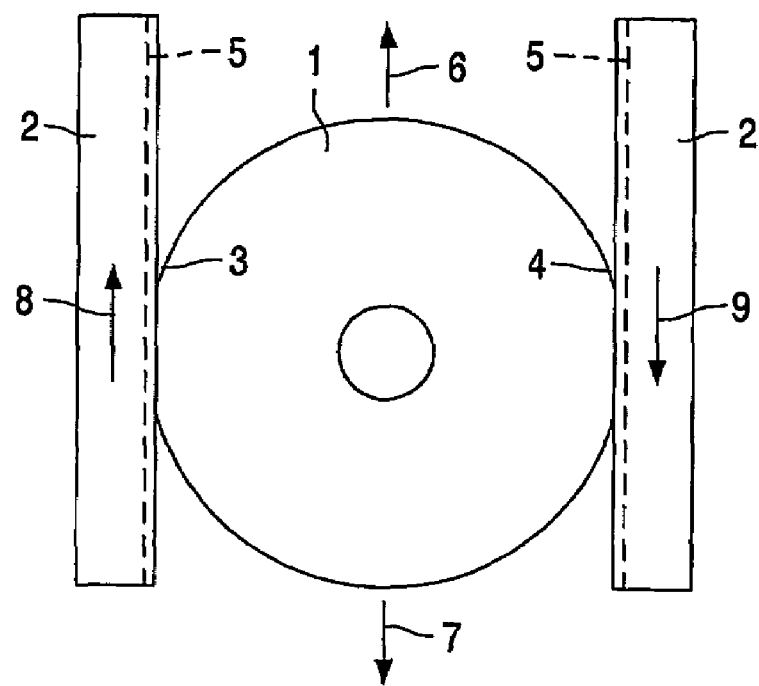
FIG. 1 shows an inserting and extracting device for digital data carrier plates such as CDs or DVDs with parallel guide rails between which a data carrier plate is guided during the insertion and extraction movements, the insertion and extraction movements being imposed on the data carrier plate via said guide rails.

FIG. 1 shows the principle of an inserting and extracting device for digital carrier plates 1 (for example CDs and DVDs). The inserting and extracting device comprises parallel guide rails 2 which extend over the full range of movement for insertion and extraction. The data carrier plate 1 is guided in grooves 5 of the guide rails 2 at diagonally mutually opposed edge regions 3, 4. Motion pulses are transmitted to the data carrier plate 1 in the one or the other direction of movement 6, 7 by at least one of the guide rails 2 in a manner to be described further below. These motion pulses, which are provided to the guide rails 2 by drives yet to be described in a pulsatory or impact-type manner, are indicated by arrows 8, 9. The pulsatory or impact-type movements of the drives are transmitted to the data carrier plate 1 by the guide rails 2. The data carrier plate accordingly moves in the pulse or impact direction, i.e. in the insertion direction or the extraction direction. The guide rails 2 vibrate under the influence of the motion pulses and thus perform a shifting action with respect to the data carrier plate 1. The arrows 8 and 9 could be misunderstood because they each point only in one direction, i.e. in mutually opposed directions, although the guide rails move to and fro in the respective locations. It should be noted, therefore, that the arrows 8 and 9 indicate the impact directions in which the guide rails 2 act on the data carrier plate 1.

Figure 2:
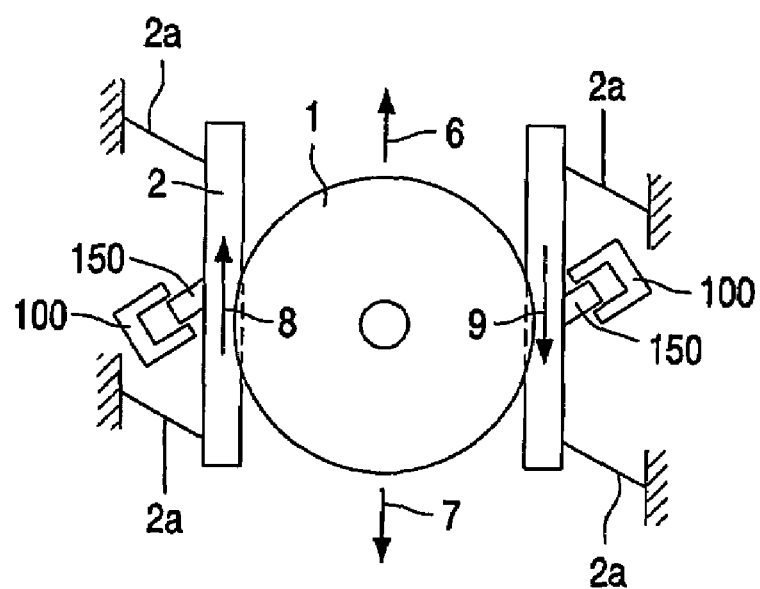
FIG. 2 shows an example of an inserting and extracting device in which the guide rails are moved by piezoelectric motors, and the resulting movements cause shifting movements of the data carrier plate.

FIG. 2 diagrammatically shows a piezoelectric drive which transmits impact-type motion pulses to the guide rails 2. Piezoelectric motors 100 serve to provide the piezoelectric drive. Tappets 150 of the motors 100 are obliquely positioned, thus clearly indicating the impact directions 8 and 9 in which they act on the guide rails and via these on the data carrier plate 1. Springs 2a pull the guide rails 2 back into the starting position after each impact.

FIG. 3 shows the active core of a piezoelectric motor 10, which is used in the form of a linear piezomotor with compact, planar construction in CD/DVD appliances. The motor 10 is excited by a standing wave and operates with all its teeth 15 in accordance with the micro impact principle. This means that only one harmonic voltage suffices for its operation. It extends over the entire path length to be traveled by the data carrier plate 1.

The piezoelectric motor 10 has an excitation cell 11 serving for the drive of at least one half wavelength. The dimension of the active cell 11 may be extended by increments of λ/2 as desired.

Figure 3A:
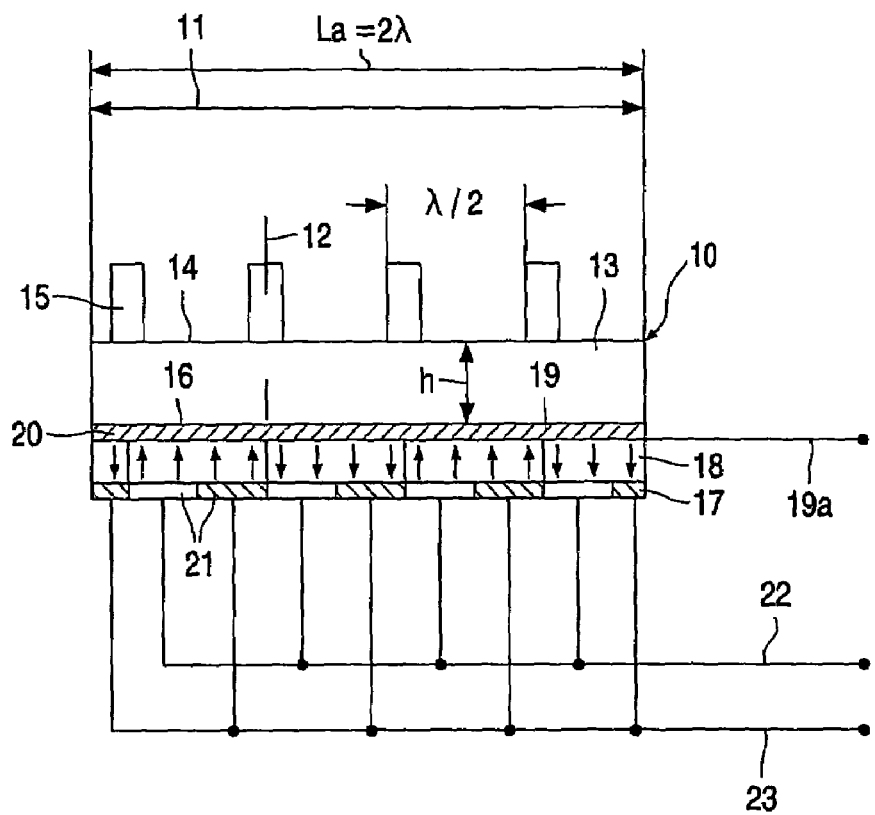
FIGS. 3a, 3b and 3c show the principle of the active region of a suitable piezoelectric motor which can be directly used as a guide rail.

FIG. 3a diagrammatically shows an operational possibility for the motor 10 with an active cell 11 of a length La=2λ. The motor 10 has a stator 13 having a height h. Stator teeth 15 with a pitch of λ/2 are provided at the one stator side 14.

The stator teeth 15 are positioned in locations 12 situated between the antinodes 26 and nodes 25 formed in the oscillation.

At the other stator side 16, a piezoelectric element 17 with a piezoceramic material 18 is arranged so as to provide the excitation. Regions of alternating polarization with a wavelength of λ/2 are formed in the piezoceramic material 18. The piezoelectric element 17 is provided with a common electrode 19 at the stator side 16. An electrode division is implemented at the other side 20. Each half of the regions of alternating polarization of λ/2 length is covered by its own partial electrode 21 here. The partial electrodes 21 of the half-wavelength λ/2 regions are alternately connected to two terminals 22 and 23 of alternating polarity.

Figure 3B:
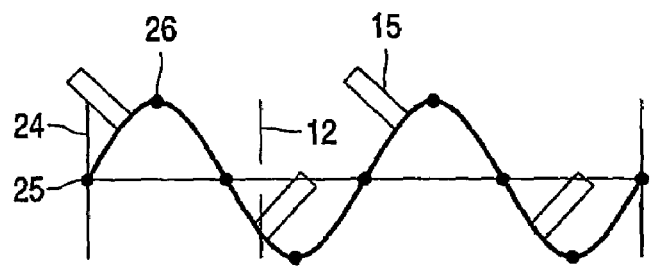

A standing wave is generated for the one drive direction by means of the piezoceramic material 18 and the electrode excitation in the active cell 11 shown in FIG. 3a such that oscillation nodes 25 are located at the ends 24 of the active cell 11, as is shown in FIG. 3b. The stator teeth 15 impact directly on the data carrier 1 and move the latter stepwise in one direction. To achieve the opposite drive direction, oscillation antinodes 26 are to be formed at the ends 24 of the active cell 11, as is shown in FIG. 3c.

The active cell 11 is further supplemented in both longitudinal directions with stator material such that the nodes 25 or antinodes 26 arise at the stator end 25 so as to form a standing wave, and thus to provide an efficient motor 10.

For a drive direction to the left as shown in FIG. 3b, stator material is required on both sides of the active cell 11, the length of which material must always correspond to an odd multiple of λ/4. The one half of the teeth points upwards to the left in the oscillation state shown and impacts on the data carrier 1 in this position. The second half in the position shown points upwards to the right, but is in the backswing phase and has no contact with the data carrier 1. Half a frequency cycle later, the tasks of the teeth have been interchanged. The first half is now in the backswing phase and points upwards to the right. The second half is in the impact phase and points upwards to the left. To excite this form of oscillation, an alternating voltage of suitable frequency is applied between the electrode terminals 22 and 19a. The piezoceramic materials 18 below the electrode 23 are not active in this direction of movement and may also be omitted. An example of such a drive is shown in FIG. 4.

Figure 3C:
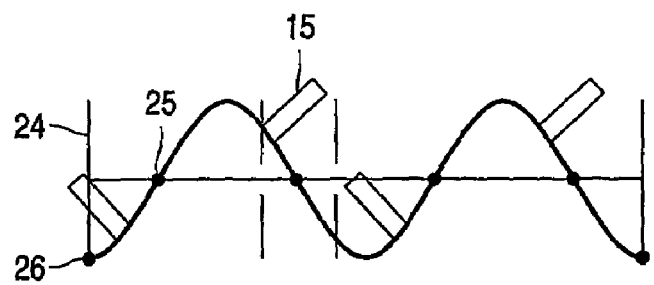

For a drive direction to the right as shown in FIG. 3c, however, stator material is necessary on either side of the active cell 11, the length of said material always corresponding to an even multiple of λ/4. An alternating voltage $U_N$ of suitable frequency is applied between the electrode terminals 23 and 19a for the excitation. The piezoceramic materials 18 below the electrode 22 are passive in this mode of operation and may be omitted. An example of such a drive is shown in FIG. 5.

An efficient motor 10 for one respective drive direction and one respective application may thus be designed without further features. The minimum length of the active cell 11 plus the additional stator material 28, 29 is one wavelength λ.

Figure 4:
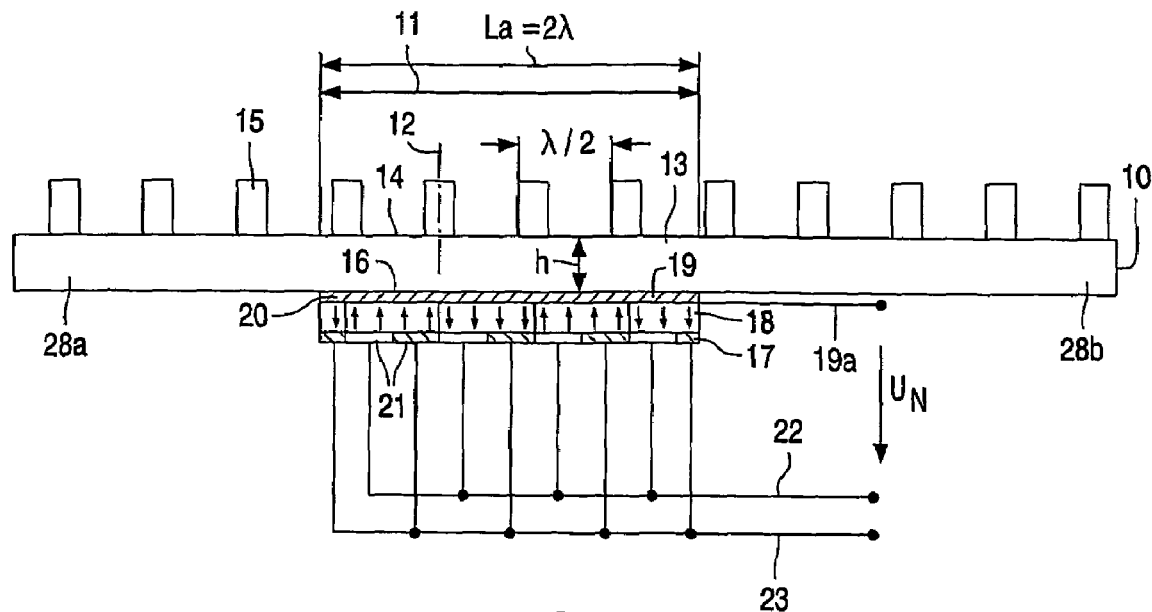
FIG. 4 shows a suitable piezomotor which can be directly used as a guide rail for a first direction of movement.

FIG. 4 shows a piezomotor 10 for a left-hand drive direction with the associated extension pieces 28a and 28b which have lengths of 7λ/4 and 9λ/4, respectively, in the situation shown.

Figure 5:
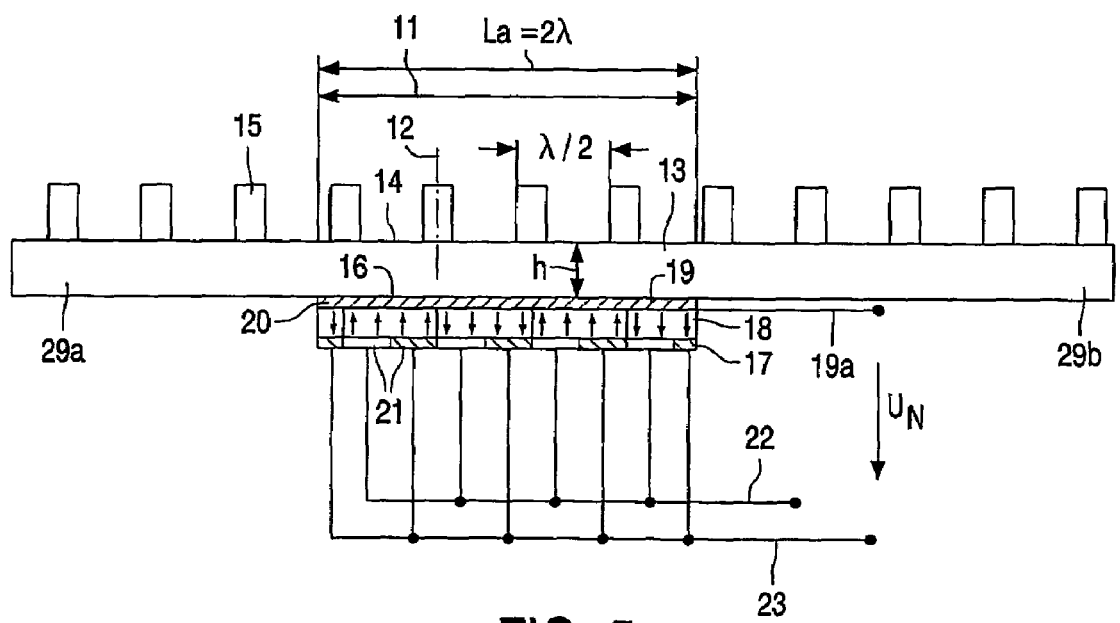
FIG. 5 shows a suitable piezomotor which can be directly used as a guide rail for a second direction of movement.

FIG. 5 shows a piezomotor 10 for a right-hand drive direction with the associated extension pieces 29a and 29b, which have lengths of 3λ and 2λ, respectively, in the situation shown.

The resonance frequency $F_i$ with which the stator 13 of such a motor 10 is operated is dependent by first approximation on the order of the standing wave I, and on the length l and the height h of the stator 13. Material constants are also important: the elasticity module E and the density ρ of the stator material. The resonance frequency is expressed by the equation:

$$F_i = \frac{((i+1/2)\cdot\pi)^2}{\sqrt{12}} \cdot h/l^2 \cdot \sqrt{E/\rho}$$

The frequency $F_3$ in the example described with reference to FIG. 2 is calculated as follows:

$$F_3 = \frac{(3,5\cdot\pi)^2}{\sqrt{12}} \cdot h/La^2 \cdot \sqrt{E/\rho}$$

This frequency hardly changes, irrespective of how long the complete stator 13 becomes, as long as the extension pieces 28, 29 are chosen in accordance with the conditions given above (odd or even multiple of λ/4).

One piezomotor 10 with only one direction of movement is used for each direction of movement.

Figure 6:
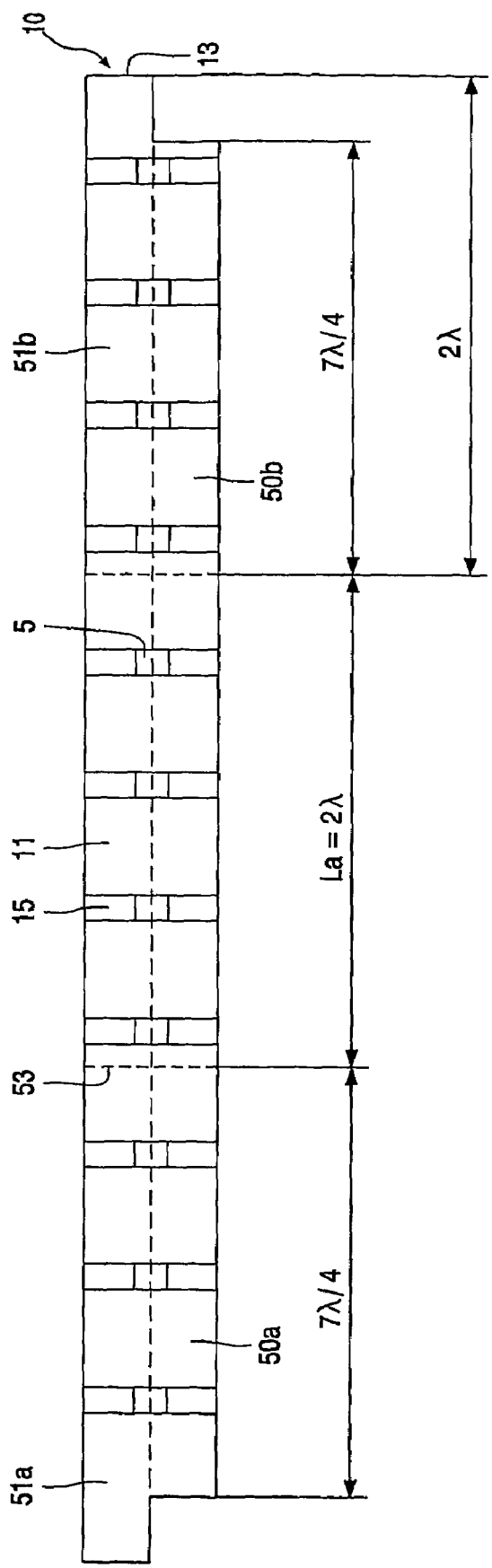
FIG. 6 shows a first piezomotor which can be directly used as a guide rail for both directions of movement.

FIG. 6 shows a piezomotor 10 for two directions of movement built around an active cell 11 in accordance with FIG. 3a in the center, with extensions at the one half for the drive direction to the left, with extension pieces 50a and 50b of 7λ/4 length, and with extensions at the other stator half for the drive direction to the right with extension pieces 51a and 51b of 2λ length, in a plan view. Grooves 5 for guiding the data carrier plate 1 are provided in the teeth 15. Extension pieces 50a, 50b, 51a, 51b and the active region 11 in the center are delineated by broken lines 53 in FIG. 5 for the sake of clarity, but in actual fact they are manufactured as one integral component and form the stator 13.

Figure 7:
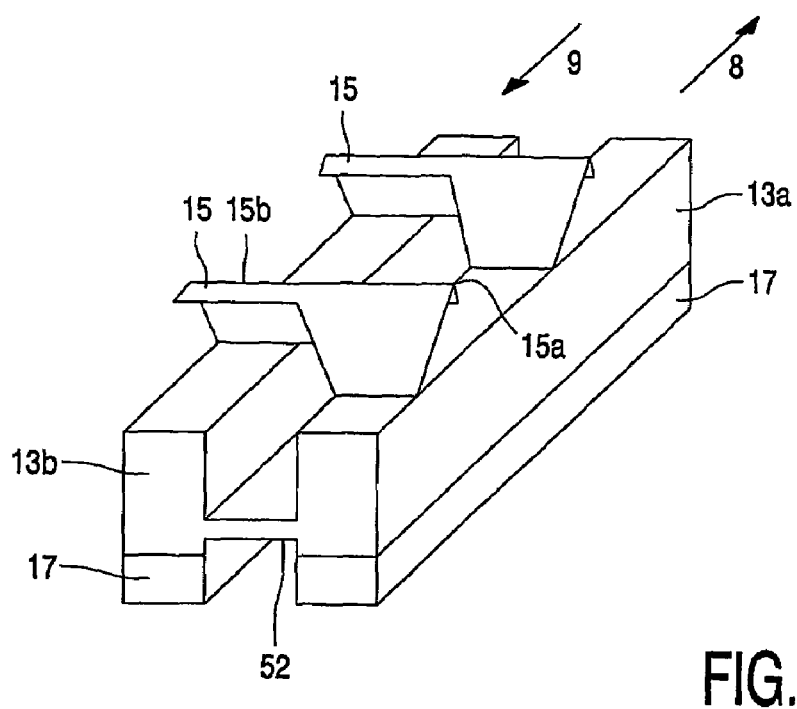
FIG. 7 shows the active cell of a second piezomotor which can be directly used as a guide rail for both directions of movement.

FIG. 7 shows the active cell of 2λ length of a piezomotor for two drive directions. The stator is divided into two halves 13a and 13b. Each stator half has piezoceramic elements 17 of the kind described above at its lower side so as to excite the desired standing waves.

The teeth 15 are constructed at the upper side of the stator halves such that the tooth halves 15a above the stator half 13a are rigid against bending with respect to upward impacts in the drive direction 8 and are readily capable of bending with respect to upward impacts in the drive direction 9. The tooth halves 15b above the stator halves 13b are rigid against bending with respect to upwards impacts in the drive direction 9 and readily capable of bending with respect to upward impacts in the drive direction 8. Such teeth may be manufactured, for example, from stamped-out, bent metal strips in a simple manner.

In this embodiment of the active cell, therefore, the stator half 13a is to be prolonged by an even multiple of λ/4 by means of extensions (movement direction to the right), and the stator half 13b is to be provided with extensions amounting to an odd multiple of λ/4 (movement direction to the left). These extensions are not shown in FIG. 7.

The two stator halves are coupled by a connecting bridge 52 in the neutral position of the standing wave.

The piezoelectric elements of the two stator halves can be electrically controlled for both drive directions in the manner described above. In a simpler modification, the stator half 13a is only excited if the movement direction 8 is desired, and the stator half 13b only if the movement direction 9 is desired.

Figure 8:
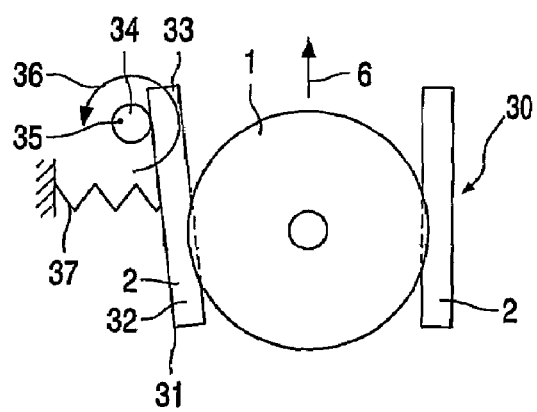
FIG. 8 shows an eccentric drive which transmits forward pulses to the data carrier plate via one of the guide rails.
Figure 9:
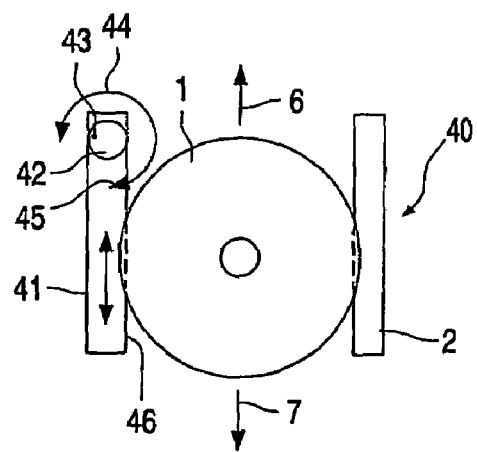
FIG. 9 shows an alternative eccentric drive which transmits forward pulses to a data carrier plate via a belt conveyor.

FIGS. 8 and 9 show inserting and extracting devices with guide rails in accordance with FIG. 1, in which the insertion and extraction take place by means of eccentric devices.

In the inserting and extracting device 30 of FIG. 8, the guide rail on the left is not arranged parallel to the insertion direction 6, as in the construction of FIG. 1, but is pivotable about a center of rotation 31 which is present at one end 32 of this guide rail 2. An eccentric piece 34 acts on the other end 33, which piece rotates about an axis 35. The direction of rotation is indicated by an arrow 36. A supporting spring 37 is also provided, pressing the guide rail 2 against the data carrier plate 1 to be inserted.

When the eccentric piece rotates in the direction of the arrow 36, oscillation pulses are transmitted to the guide rail 2. These oscillation pulses cause the guide rail 2 of the data carrier plate 1 to perform forward pulsatory movements in the direction of the arrow 6. A similarly operating drive is provided for the extraction, operating in the extraction direction.

FIG. 9 shows an inserting and extracting device 40 which operates with a belt conveyor in the form of a rubber band 41. The right-hand guide rail 2 is again positioned parallel to the insertion and extraction directions 6, 7. The rubber band 41 is elastic and is capable of transmitting pulsatorily generated stretching movements to the data carrier plate 1. An eccentric piece 42 rotating about an axis 43 serves to generate the pulsatory stretching movements. In the case of rotation in a direction indicated by the arrow head 44, the stretching movements imparted to the rubber band 41 take place such that the data carrier plate 1 experiences forward pulses in the insertion direction 6 and is thus inserted. If the eccentric piece 42 rotates in a direction indicated by the arrow head 45, the data carrier plate 1 experiences forward pulses in the extraction direction 7. The rubber band 41 has a grooved profile 46 facing the data carrier plate 1, into which profile the edge 3 of the data carrier plate 1 enters.

The invention claimed is:

1. An inserting and extracting device for rotatable data carrier plates which mechanically moves the data carrier plate (1) from an inserting position into a playing position before playing and back into the inserting position again after playing, with parallel guide rails (2) which extend over the full range of movement for insertion and extraction and which guide the data carrier plate (1) in grooves (5) at diagonally mutually opposed edge regions, wherein at least one of the guide rails (2) transmits to the data carrier plate (1) motion pulses in one of its directions of movement, by means of which pulses the data carrier plate (1) is moved in the insertion or extraction direction.

2. An inserting and extracting device as claimed in claim 1, characterized in that the motion pulses are exerted on one or both of the guide rails (2) by means of a piezoelectric drive (100).

3. An inserting and extracting device as claimed in claim 2, characterized in that the piezoelectric drive is formed by piezomotors (100), each of which exerts an impact force on one guide rail (2).

4. An inserting and extracting device as claimed in claim 3, characterized in that the piezomotor (10) has approximately the length of the path of movement of the data carrier plate (1).

5. An inserting and extracting device as claimed in claim 1, characterized in that each guide rail (2) itself is a piezomotor (10) comprising a stator (13) provided with stator teeth (15) and a piezoelectric element (17) whose active cell (11) serving for driving has a length of at least one half wavelength.

6. An inserting and extracting device as claimed in claim 5, characterized in that only one guide rail (2) is itself a piezomotor comprising a stator (13) provided with stator teeth (15) and a piezoelectric element (17) whose active, exciting cell (11) has a length of at least one half of a wavelength or an integer multiple of one half of a wavelength.

7. An inserting and extracting device as claimed in claim 5, characterized in that each guide rail (2) itself is a piezomotor (10) comprising a stator (13) provided with stator teeth (15) and a piezoelectric element (17), wherein the length of the exciting part corresponds to two wavelengths.

8. An inserting and extracting device as claimed in claim 5, characterized in that the piezoelectric element (17) of the motor (10) is formed by a piezoelectric ceramic material (18) which has regions of alternating polarity with a length of half a wavelength ($\lambda/2$), while covering electrodes (19, 21) are provided, of which one electrode (19) adjoining the stator (13) extends over the full length of the ceramic material (18), and electrodes (21) having a length of $\lambda/4$ and situated at the other side of the ceramic material (18) are alternately connected to terminals (22, 23) of alternating polarity.

9. An inserting and extracting device as claimed in claim 5, characterized in that only those regions of a piezomotor (10) for one direction of movement which are covered by associated control electrodes (19, 21) are made from piezoceramic material.

10. An inserting and extracting device as claimed in claim 5, characterized in that the stator (13) for one impact direction is prolonged in longitudinal direction over and beyond the piezoelectric element (17) by means of extensions (28) to an amount of an odd multiple of $\lambda/4$.

11. An inserting and extracting device as claimed in claim 5, characterized in that the stator (13) for an opposed impact direction is prolonged in longitudinal direction over and beyond the piezoelectric element (17) by means of extensions (29) to an amount of an even multiple of $\lambda/4$.

12. An inserting and extracting device as claimed in claim 5, characterized in that the minimum length of the active cell (11) and additional stator material (28, 29) corresponds to at least one wavelength $\lambda$.

13. An inserting and extracting device as claimed in claim 5, characterized in that the exciting portion of the stator (13) is prolonged by odd multiples of one fourth of a wavelength ($\lambda/4$) on one half of the guide rail (2) and by even multiples of $\lambda/4$ on the other half.

14. An inserting and extracting device as claimed in claim 13, characterized in that the two halves of the guide rails (2) are decoupled from one another by means of blade springs at the level of the neutral oscillation line.

15. An inserting and extracting device as claimed in claim 5, characterized in that the resonance frequency $F_i$ of the motor is expressed by $$F_i = \frac{((i+1/2) \cdot \pi)^2}{\sqrt{12}} \cdot h/l^2 \cdot \sqrt{E/p},$$

in which i by first approximation is dependent on the order of the standing wave I, on the length l of the stator, on the height h of the stator, on the material constant, on the elasticity module E, and on the density ρ of the stator material.

16. An inserting and extracting device as claimed in claim 5, characterized in that the stator teeth (15) are arranged at distances of λ/2 in locations between the antinodes (26) and nodes (25) formed in the oscillation.

17. An inserting and extracting device as claimed in claim 5, characterized in that the stator teeth (15) are provided with grooves (5) in longitudinal direction of the piezomotor (10), into which grooves (5) the data carrier plate (1) enters with its edge (3).

18. A piezoelectric motor as claimed in claim 5 for providing the linear movement of components to be moved by means of impact pulses.

19. An inserting and extracting device as claimed in claim 1, characterized in that the motion pulses are transmitted to the respective guide rail (2, 41) and through the latter to the data carrier plate (1) by means of an eccentric mechanism (34, 42).

20. An inserting and extracting device as claimed in claim 19, characterized in that the eccentric mechanism (34) causes the guide rail (2) propelled by said eccentric mechanism (34) to oscillate about a center of rotation (31), and the oscillations of the guide rail (2) impart to the data carrier plate (1) a forward pulse in the motion direction (6).

21. An inserting and extracting device as claimed in claim 19, characterized in that the eccentric mechanism (42) transmits oscillation pulses to a belt conveyor (41), which transmits said pulses as driving pulses to the data carrier plate (1).

22. An inserting and extracting device as claimed in claim 21, characterized in that the belt conveyor (41) moves the data carrier plate (1) in the insertion or extraction direction in accordance with the direction of its circulatory movement.

23. An inserting and extracting device as claimed in claim 21, characterized in that the belt conveyor (41) has a grooved profile (46) with which the edge (3) of the data carrier plate (1) comes into engagement.

* * * * *